(12) United States Patent
DeDecker et al.

(10) Patent No.: US 6,727,330 B1
(45) Date of Patent: Apr. 27, 2004

(54) TERMINATION AND REDUCED GEL IN HIGH CIS POLYBUTADIENE

(75) Inventors: Mark N. DeDecker, North Canton, OH (US); Harry L. Wright, Lake Charles, LA (US); Jason M. Pyle, Smackover, AR (US)

(73) Assignee: Firestone Polymers, LLC, Akron, OH (US)

( * ) Notice: Subject to any disclaimer, the term of this patent is extended or adjusted under 35 U.S.C. 154(b) by 0 days.

(21) Appl. No.: 10/360,285

(22) Filed: Feb. 7, 2003

(51) Int. Cl.$^7$ ............... C08F 4/60; C08F 4/80; C08F 236/06
(52) U.S. Cl. .......... 526/133; 526/169.1; 526/340.4
(58) Field of Search ............... 526/133, 169.1, 526/340.4

(56) References Cited

U.S. PATENT DOCUMENTS

| | | |
|---|---|---|
| 3,170,905 A | 2/1965 | Ueda et al. |
| 3,190,869 A | 6/1965 | Weygand et al. |
| 3,400,115 A | 9/1968 | Dawans et al. |
| 3,483,177 A | 12/1969 | Throckmorton et al. |
| 3,497,489 A | 2/1970 | Saltman et al. |
| 3,528,957 A | 9/1970 | Throckmorton et al. |
| 3,624,000 A | 11/1971 | Throckmorton |
| 3,753,967 A | 8/1973 | Graff et al. |
| 3,816,567 A | 6/1974 | Yagi et al. |
| 3,843,618 A | 10/1974 | Yagi et al. |
| 3,856,764 A | 12/1974 | Throckmorton et al. |
| 4,020,255 A | 4/1977 | Schoneman et al. |
| 4,223,116 A | 9/1980 | Moczygemba et al. |
| 4,340,685 A | 7/1982 | Takeuchi et al. |
| 4,501,866 A | 2/1985 | Roggeman et al. |
| 4,952,304 A | 8/1990 | Timms |
| 5,100,982 A | 3/1992 | Castner |
| 5,109,082 A | 4/1992 | Matsuda et al. |
| 5,686,543 A | 11/1997 | Yasuda et al. |
| 5,731,381 A * | 3/1998 | Apecetche et al. |
| 5,955,553 A | 9/1999 | Oziomek et al. |
| 6,013,746 A | 1/2000 | Jang et al. |
| 6,136,931 A | 10/2000 | Jang et al. |

* cited by examiner

*Primary Examiner*—Caixia Lu
(74) *Attorney, Agent, or Firm*—Scott A. McCollister; Joseph E. Waters

(57) ABSTRACT

The present invention is directed to a process for forming a high-cis polydiene. The process includes catalyzing a diene polymerization, and terminating the polymerization with a termination mixture comprising an inorganic base and at least one of an amine and a carboxylic acid. The catalyst system is a mixture of (a) organoaluminum compounds; (b) organonickel compounds; and (c) fluorine-containing compounds. The use of an inorganic base reduces the amount of more expensive amine necessary to effectively terminate the polymerization as well as reducing the corrosion in the reaction container. The use of an inorganic base with a carboxylic acid results in a very low gel content as well as reducing the corrosion in the process systems.

26 Claims, No Drawings

TERMINATION AND REDUCED GEL IN HIGH CIS POLYBUTADIENE

FIELD OF THE INVENTION

This invention relates to diene polymerization, particularly to high-cis diene polymerization. More particularly, the present invention relates to a high-cis, low gel polydiene and a process for producing the same.

BACKGROUND OF THE INVENTION

High cis polydienes have been prepared using an organonickel based catalyst system. The use of the organonickel based catalyst system can result in a rapid rate of polymerization, and the ability to control various polymer properties by varying the catalyst ratios. Moreover, organonickel based catalyst systems are generally hardy catalysts that may be able to maintain catalytic activity at a wide range of polymerization conditions. The use of organonickel catalysts to form high cis polydienes relies on the need for a fluorine-containing co-catalyst, such as HF or $BF_3$. These co-catalysts, however, may be cumbersome to work with as they tend to generate strong acids when contacting water, leading to possible equipment corrosion and possible gel-formation of the polymer. Moreover, the reaction products of the co-catalysts include trialkylboranes when $BF_3$ is used, which can react with molecular oxygen to form peroxyboranes, compounds that may spontaneously homolytically break to form radicals, increasing the gel content upon aging of the finished products.

A variety of terminators, including water, alcohols, polyols, amines, and carboxylic acids have been used to terminate nickel-catalyzed diene polymerizations. Although such terminators may be effective in the termination of the diene polymerization, the protic solvents are capable of reacting with fluoride containing compounds in the polymerization mixture, generating strong acids, which may lead to corrosion problems in the finishing equipment and can also lead to cationic coupling (gelation) of the finished polymer.

Amine termination is another method that has been used in previous syntheses of high-cis polydienes, with the amine acting as a base to neutralize any acidic compounds in the polymerization mixture, reducing corrosion and cationic gellation. The bases thus formed also react with trialkylboranes to form Lewis acid-Lewis base complexes. These complexes reduce the reactivity of trialkylboranes toward oxygen, thus reducing the generation of radicals, which leads to gel formation. Unfortunately, such amine terminators are often quite, expensive, thus increasing the cost of the overall process.

It would thus be desirable to develop a system for terminating the synthesis of high-cis polydienes that would be capable of overcoming the increased gel content and/or equipment corrosion experienced with the above, mentioned termination systems while maintaining or reducing costs.

SUMMARY OF THE INVENTION

The present invention is directed to a process for forming a high-cis polydiene. The process includes catalyzing a diene polymerization, and terminating the polymerization with a termination mixture comprising an inorganic base and at least one of an amine and a carboxylic acid.

In another embodiment, the present invention is directed to a polymer composition including a high-cis polydiene terminated with an inorganic base and at least one of an amine and a carboxylic acid. The polydiene preferably has a cis content greater than about 85–90% and a static gel content less than about 5%.

In a third embodiment, the present invention is directed to a process for producing high-cis polydienes. The process includes a continuous polymerization of a nickel catalyzed polydiene terminated by a termination mixture comprising sodium hydroxide and at least one of an amine and a carboxylic acid.

DETAILED DESCRIPTION OF ILLUSTRATIVE EMBODIMENTS

A process for forming a high-cis polydiene composition is provided. The process includes catalyzing a polydiene polymerization, followed by termination with a termination mixture comprising an inorganic base. The catalyzation of the polymerization reaction is preferably carried out with a catalyst system including at least one organonickel compound, at least one organoaluminum compound, and at least one fluorine-containing compound. A termination mixture is used to terminate the polymerization. The inclusion of an inorganic base, such as NaOH, to the termination mixture provides for the neutralization of acidic byproducts often formed during the polymerization and termination reactions, thereby reducing corrosion to the vessels and equipment used in the polymerization process. The use of an inorganic base also reduces the amount of more expensive compounds used in amine termination reactions.

The resultant high-cis polydiene composition preferably has a cis content greater than about 85%, more preferably greater than about 92%. The composition has a static gel content that is preferably less than 5%, more preferably less than 1.0%.

The component of the catalyst of this invention which contains nickel may be any organonickel compound. It is preferred to employ a soluble compound of nickel. Thus, nickel salts of carboxylic acids and organic complex compounds of nickel are suitable. These soluble nickel compounds are normally compounds of nickel with a mono- or bi-dentate organic ligand containing up to 20 carbons. "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed. By the term "soluble" is meant soluble in inert solvents. Thus, any salt of an organic acid containing from about 1 to 20 carbon atoms may be employed. Representative of organonickel compounds are nickel benzoate, nickel acetate, nickel naphthenate, nickel octanoate, bis(alpha-furyl dioxime) nickel, nickel palmitate, nickel stearate, nickel acetylacetonate, nickel salicaldehyde, bis(salicylaldehyde) ethylene diimine nickel, bis(cyclopentadienyl) nickel, cyclopentadienylnickel nitrosyl and nickel tetracarbonyl. The preferred component containing nickel is a nickel salt of a carboxylic acid or an organic complex compound of nickel, such as a nickel boroacylate in which the acyl group is derived from the organic acids cited above.

By the term "organoaluminum compound" it is meant any organoaluminum compound corresponding to the formula:

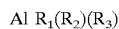

in which $R_1$ is selected from the group consisting of alkyl (including cycloalkyl), aryl alkaryl, arylalkyl, alkoxy, and hydrogen; $R_2$ and $R_3$ being selected from the group of alkyl (including cycloalkyl), aryl, alkaryl, and arylalkyl. Representative of the compounds corresponding to the formula set forth above are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenylethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride and other organoaluminum hydrides. Also included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. Also included are diethylaluminum ethoxide, diisobutylaluminum ethoxide and dipropylaluminum methoxide.

Another component of the catalyst system employed in this invention is a fluorine containing compound. The fluorine may be supplied by hydrogen fluoride, boron trifluoride, or by hydrogen fluoride and boron trifluoride being complexed with a member of the class consisting of monohydric alcohols, phenols, water, mineral acids containing oxygen, water, aldehydes, esters, ethers, ketones and nitriles.

The ketone subclass can be defined by the formula R'COR where R' and R represent a alkyl, cycloalkyl, aryl, alkaryl and arylalkyl radicals containing from 1 to about 30 carbon atoms; R' and R may be the same or dissimilar. These ketones represent a class of compounds which have a carbon atom attached by a double bond to oxygen. Representative but not exhaustive of the ketones useful in the preparation of the boron trifluoride and hydrogen fluoride complexes of this invention are acetone, methyl ethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. Typical complexes of the ketones are boron trifluoride.acetophenone and boron trifluoride.benzophenone, also hydrogen fluoride.acetophenone and hydrogen fluoride.benzophenone and hydrogen fluoride.acetone.

The aldehyde subclass can be defined by the formula R—CHO where R represents an alkyl, cycloalkyl, aryl, alkaryl and arylalkyl radical containing from 1 to about 30 carbon atoms. The aldehydes have a carbon atom attached to an oxygen atom by means of a double bond. Representative but not exhaustive of the aldehydes are butyraldehyde, anisaldehyde, cinnamic aldehyde, isobutyraldehyde, heptaldehyde, dodecylaldehyde, benzaldehyde, phenylacetaldehyde, tolualdehyde, m-nitrobenzaldehyde, p-nitrobenzaldehyde, m-hydrobenzaldehyde and the like. Typical complexes formed from the aldehydes are boron trifluoride-benzaldehyde, boron trifluoride-tolualdehyde, hydrogen fluoride-benzaldehyde and hydrogen fluoride-tolualdehyde.

The ester subclass can be represented by the formula R'—COOR where R' and R are represented by alkyl, cycloalkyl, aryl, alkaryl, and arylalkyl radicals containing from 1 to about 30 carbon atoms. The esters contain a carbon atom attached by a double bond to an oxygen atom. Representative but not exhaustive of the esters are ethyl butyrate, ethyl octanoate, isopropyl hexanoate, amyl acetate, hexyl propionate, cetyl acetate, ethyl benzoate, amyl benzoate, phenyl acetate, phenyl butyrate, phenyl benzoate and the like. Typical complexes formed from the esters are boron trifluoride-ethyl benzoate and boron trifluoride-phenyl acetate; also hydrogen fluoride-ethyl benzoate, and hydrogen fluoride-phenyl acetate.

The ether subclass can be defined by the formula R—O—R where each R independently represents an alkyl, cycloalkyl, aryl, alkaryl and arylalkyl radical containing from 1 to about 30 carbon atoms. Representative but not exhaustive of the ethers are ethoxybutane, ethoxyoctane, isopropoxyhexane, propoxyhexane, ethoxybenzene, amyloxybenzene and the like.

The nitrile subclass can be represented by the formula RCN wherein R represents an alkyl, cycloalkyl aryl, alkaryl, and arylalkyl. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. Typical complexes prepared from the nitrites are boron trifluoride.benzonitrile, and hydrogen fluoride.benzonitrile.

The monohydric alcohol subgroup of the above class of compounds can be symbolically portrayed as ROH where R represents an alkyl, cycloalkyl, and an arylalkyl radical containing from 1 to 30 carbon atoms. Representative, but not exhaustive of the alcohol group, are methanol, ethanol, n-propanol, isopropanol, n-butanol, benzyl alcohol, and the like. Typical complexes formed from the above groups are as follows: $BF_3$.methanol, $BF_3$.ethanol, $BF_3$.butanol, $BF_3$.n-hexanol HF.methanol, HF.butanol and HF.hexanol.

The phenol subgroup of the above class of compounds can be symbolically portrayed as $\Phi$-OH wherein $\Phi$ represents a benzenoid group. Representative but not exhaustive of the phenol group are phenol, p-cresol, resorcinol, naphthol, hydroquinone and the like. Typical complexes formed from the above phenol subgroup are as follows: $BF_3$·2-phenol, $BF_3$·p-cresol, HF.p-cresol and HF.phenol.

A number of the members in the subgroup mineral acids containing oxygen will complex with $BF_3$ and HF. Representative but not exhaustive of the mineral acid subgroup are phosphoric acid, sulfuric acid, nitric acid and the like. The preferred complexes formed from the mineral acid subgroup are $BF_3$·100% phosphoric acid and $BF_3$·85% phosphoric acid, and HF·100% phosphoric acid.

Water, although in a subgroup by itself, forms at least two hydrate complexes. These are $BF3 \cdot H_2O$ and $BF_3 \cdot 2H_2O$.

When not available commercially, many of the boron trifluoride complexes can be readily formed by directly contacting boron trifluoride gas, (a colorless gas at ordinary temperatures and pressures) with the compound used as the complexing agent, that is, the electron donor compound. This contact is accomplished with a reacting apparatus combined with a sensitive weighing mechanism in order to achieve the desired mole ratios between the $BF_3$ and the electron donor compound. The reaction is carried out under an inert atmosphere. The reaction environment may consist only of the reacting components, $BF_3$ gas, and the electron donor compound, or when convenient, the reaction may be carried out in the medium of an inert organic diluent. This last condition is usually necessary when the electron donor compound exists as a solid and must be put into solution or suspension to insure adequate contact with the $BF_3$ gas.

The various boron trifluoride complexes vary greatly in their shelf life stability. Some, for example, $BF_3$·isopropanol are quite unstable in daylight at room temperature. Others, for example, $BF_3$·phenol are quite stable and possess a relatively long shelf life at room temperature. Where the particular $BF_3$ complex, specified as a catalyst component, possesses an unstable shelf life, it should be prepared as near to the time of polymerization as feasible.

Hydrogen fluoride is a limpid liquid which fumes strongly in air, is very poisonous, forms ulcerated sores if it comes in contact with the skin, and is very dangerous to handle or to manipulate. By complexing the hydrogen fluoride with the complexing agents heretofore mentioned, some of the advantages of this invention are a safer, easier and more accurate way of handling the hydrogen fluoride component of the catalyst system. Hydrogen fluoride complexes usually have a lower vapor pressure and do not fume as badly as does hydrogen fluoride. Hydrogen fluoride boils at 19.7° C., whereas a 40% by weight of hydrogen fluoride diethyl ether azeotrope boils at 74° C. When the hydrogen fluoride is complexed, the corrosiveness of the hydrogen fluoride is reduced. The hydrogen fluoride complex can be dissolved in a solvent and thus can be handled and charged to the system as a liquid solution. The solvent which can be employed may be an alkyl, alkaryl, arylalkyl or an aryl hydrocarbon. Benzene, for example, is a convenient solvent system.

The complexes of this invention are usually prepared by simply dissolving appropriate amounts of the complexing agent, for instance, a ketone, an ether, an ester, an alcohol, a nitrile or water, in a suitable solvent and an appropriate amount of the hydrogen fluoride in a suitable solvent and mixing the two solvent systems. The mixing of the complexing agents, except water, should be done in the absence of water vapor. Another possible method would be to dissolve either the hydrogen fluoride or the complexing agent in a suitable solvent and adding the other component. Still another method of mixing would be to dissolve the complexing agent in a solvent and simply bubble gaseous hydrogen fluoride through the system until the complexing agent is reacted with hydrogen fluoride. The concentrations may be determined by weight gain or chemical titration. The amount of complexing agent cannot be specifically set down. The amount of complexing agent may be a range depending on the conditions of the reaction system, the hydrogen bonding strength of the complexing agent, the size of the complexing agent, or it may be an equilibrium between the hydrogen fluoride complex and the hydrogen fluoride plus the complexing agent.

When the fluorine containing compound is derived from boron; trifluoride or a boron trifluoride complex, the optimum concentration from any one catalyst component changes from that when HF is employed, since boron trifluoride contains three atoms of fluorine, and thus the molar ratio of the catalyst components will be different. For instance, when the organoaluminum compound (Al) to the organonickel compound (Ni) ranges from about 0.3/1 to about 500/1, and when the mole ratio of the boron trifluoride complex prepared by complexing boron trifluoride with a member of the class consisting of esters, aldehydes, ketones and nitriles ($BF_3$ complex) to the organonickel compound (Ni) ranges from about 0.3/1 to about 500/1, the mole ratio of the organoaluminum (Al) to the $BF_3$ complex ranges from about 0.1/1 to about 4/1.

The preferred Al/Ni mole ratio ranges from about 1/1 to about 150/1; the preferred $BF_3$ or $BF_3$ complex/Ni mole ratio ranges from about 1/1 to about 150/1; and the preferred Al/$BF_3$ complex mole ratio ranges from about 0.3/1 to about 1.4/1.

When the fluorine containing compound is derived from hydrogen fluoride or a hydrogen fluoride complex, the polymerization activity is successful over a wide range of catalyst concentrations and catalyst ratios. The three catalyst components interact to form the catalyst components. As a result, the optimum concentration or any one catalyst component is very dependent upon the concentration of each of the other two catalyst components. Furthermore, while polymerization will occur over a wide range of catalyst concentrations and mole ratios, polymer having the most desirable properties are obtained over a more narrow range.

Polymerization can occur while the mole ratio of the organoaluminum compound (Al) to the organonickel compound (Ni) ranges from about 0.3/1 to about 300/1; the mole ratio of HF or hydrogen fluoride complex (HFC) to the organonickel compound (Ni) ranges from about 2/1 to about 300/1 and the mole ratio of hydrogen fluoride complex to the organoaluminum compound ranges from about 0.2/1 to about 15/1. However, the preferred mole ratios of Al/Ni ranges from about 2/1 to about 80/1, the preferred mole ratio of HF or HFC/Ni ranges from about 5/1 to about 100/1 and the preferred mole ratio of HF or HFC/Al ranges from about 0.4/1 to about 7/1. The concentration of the catalyst employed depends on factors such as purity, rate desired, temperature and other factors, therefore, specific concentrations cannot be set forth except to say that catalytic amounts are used. Although not intended to be limiting, a specific exemplary catalyst combination suitable for polymerizing butadiene in hexane to produce elastomers having desirable properties according to the present invention includes from 0.010–0.020 mmoles nickel boroacylate, 1.0–2.0 mmoles $BF_3$ and 1.0–1.5 mmoles tri-isobutly aluminum per 100 g butadiene.

The catalyst system may optionally include an alcohol component. The alcohol component is preferably selected from the group consisting of $C_2$ to $C_{20}$ alcohols, or more preferably n-hexanol or n-octanol, and mixtures thereof. It may be preferred to coordinate an alcohol component to a fluoride compound.

Suitable dienes for use in preparation of the subject high cis, low gel polydiene include conjugated dienes. $C_4$–$C_8$ conjugated diene monomers are the most preferred. Preferred conjugated diene monomer units are selected from the group consisting of 1,3-butadiene, 1,3-pentadiene, 2,4-hexadiene, isoprene, and mixtures thereof. Especially preferred are 1,3-butadiene monomer units.

The polymerization may optionally include additional monomer units, such as vinyl substituted aromatic hydrocarbon monomer units. Where included, preferred vinyl substituted aromatic hydrocarbon monomer units are selected from one or more of styrene, a-methyl-styrene, 1-vinyl naphthalene, 2-vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is generally not greater than about 18, as well as any di- or tri-vinyl substituted aromatic hydrocarbons, and mixtures thereof.

The polymerization may be carried out by any methods known in the art. The preferred method of the invention involves continuously feeding the monomer and catalyst streams to a polymerization reactor. This can be accomplished by continuously and separately feeding the monomer and catalyst streams to the reactor. However, it is often preferred to first blend the monomer and catalyst streams together prior to injection into the polymerization reactor. It should also be noted that while not a preferred procedure, it may be possible to employ the in-situ method of catalyst composition addition by separately injecting the organonickel compound, the organoaluminum compound and the fluorine-containing compound into the reactor.

The polymerizations of this invention are conducted in an inert hydrocarbon solvent and are consequently solution polymerizations. The term "inert solvent" means that the solvent does not enter into the structure of the resulting polymer, does not adversely affect the properties of the resulting polymer and does not adversely affect the activity of the catalyst employed. Suitable hydrocarbon solvents which may be employed include aliphatic, aromatic or cycloaliphatic hydrocarbons such as hexane, pentane, toluene, benzene, cyclohexane and the like. The preferred hydrocarbon solvents are aliphatic hydrocarbons and of these hexane is particularly preferred.

The solvent/monomer volume ratio may be varied over a wide range. From 4:1 to 10:1 volume ratio of solvent to monomer can be employed. Suspension polymerization may be carried out by using a solvent, e.g., butane or pentane, in which the polymer formed is insoluble. It should be understood, however, that it is not intended to exclude bulk polymerizations from the scope of this application.

The polymerizations of the invention should be carried out under an inert atmosphere such as nitrogen and precautions should be taken to exclude materials such as water and air which will deactivate the catalyst components.

Once a desired conversion is achieved, the polymerization can be terminated with a termination mixture comprising an inorganic base and a noncoupling type of terminator that inactivates the catalyst, such as water, an acid, a lower alcohol, and the like or with a coupling agent. An antioxidant such as 2,6-di-tert-butyl-4-methylphenol may be added along with, before or after the addition of the terminator. Terminators suitable for use in the termination mixture with the inorganic base in the present invention include amines as well as water, alcohols, polyols and carboxylic acids. Particularly preferred termination mixtures include an inorganic base with at least one amine and/or carboxylic acid.

Inorganic bases suitable for use in the termination mixture of the present invention include any inorganic base capable of deactivating the catalyst components as well as neutralizing acidic byproducts produced during polymerization while not detrimentally reacting with the polymer chains. Nonlimiting examples of suitable inorganic bases include inexpensive bases such as hydroxides, carboxylates and carbonates of various metals. A preferred inorganic base is NaOH. A second preferred inorganic base is $NaCO_3$.

A particularly preferred termination mixture for use in the present invention includes an inorganic base in an amine-water mixture. When a mixture of water and an amine are used to terminate the polymerization, the water reacts with the organoaluminum compounds and/or fluorine containing compounds to deactivate the catalyst components, leaving the amine available to react with the trialkylboranes. The use of an amine-water mixture is detailed in commonly assigned copending U.S. patent application Ser. No. 10/208,520, filed Jul. 30, 2002 now U.S. Pat. No. 6,596,825, entitled "Low Gel High Cis Polydiene", the disclosure of which is incorporated herein by reference. The inorganic base can be used to neutralize the acidic byproducts of the termination and polymerization reactions. This allows for the addition of less amine and reduces or eliminates corrosion in the reaction vessel by raising the pH of the system.

The inorganic base/amine/water mixture may be added in conjunction or in series. It is preferred that the mixture be added in series. The preferred molar ratio of amine:water is about 1:100, more preferably about 1:500. The water component of the termination mixture may additionally include an alcohol. Preferred alcohols are one or more of methanol, ethanol, isopropanol, propanol, and butanol. When included, a preferred water:alcohol ratio may be about 1:500, more preferably about 1:50. Alternately, the water can be omitted from the termination mixture such that the termination mixture includes only an amine/inorganic base mixture.

Suitable amines include ammonia, ammonium hydroxide, primary amine, secondary amine, tertiary amine, aliphatic amine and aromatic amine. Exemplary amines include, but are not limited to, pyridine, aniline, benzylamine, n-butylamine, cyclohexylamine, diethylamine, diisopropylamine, dimethylamine, diphenylamine, ethylamine, ethylenediamine, hexamethylene diamine, N,N-diethylcyclohexylamine, N,N-dimethylcyclohexylamine, N,N,N'-trimethyl ethylene diamine, N,N,N'N'-tetramethyl ethylene diamine (TMEDA); and substituted pyridines such as N,N-dimethylaminopyridine (DMAP), 4-pyrrolidinopyridine, and 4-piperidinopyridine. TMEDA is particularly preferred as the amine component of the termination mixture, with or without the use of water.

A second preferred termination mixture includes a carboxylic acid and an inorganic base. The inorganic base includes those described above. Suitable carboxylic acids include those represented by the formula

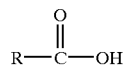

wherein R is selected from the group consisting of alkyl, cycloalkyl and arylalkyl substituted or unsubstituted containing from 3 to 20 carbon atoms. A preferred carboxylic acid for use in the termination mixture is 2-ethyl hexanoic acid (EHA) A metal salt of a carboxylic acid may also be added to the termination mixture. Thus, another preferred termination mixture includes a mixture of EHA and the calcium salt of EHA. As with the amine based termination mixture described above, water may or may not be included in the carboxylic acid based termination mixture. Again, the inorganic base is thought to react with acid byproducts believed to be produced during polymerization as well as any acidic products that may result from residual water reacting with the EHA or other carboxylic acid used.

When used with both the amine and the carboxylic acid, the amount of inorganic base added to the reaction mixture is preferably enough to maintain the pH in the reaction vessel above 7. Preferably, an amount of inorganic base is added to adjust the pH to about 7–9. Although not intended to be limiting, a suitable amount for use in the present invention is an amount equal to the molar equivalent of the $F^-$ ions present in the reaction mixture from the addition of $BF_3$ or other fluorine catalyst compound. The use of the inorganic base in the termination mixture reduces the amount of amine necessary to effectively terminate the polymerization.

Regardless of the exact composition of the termination mixture, the polymer cement is then transferred to a blend tank, where it is stored until such time as it is desolventized in a manner known by those skilled in the art, such as a hot water stripping system.

When the polymerization reaction has been stopped, the polymer can be recovered from the polymerization mixture by conventional procedures of desolventization and drying. For instance, the polymer may be isolated from the polymerization mixture by coagulation of the polymerization mixture with an alcohol such as methanol, ethanol, or isopropanol, or by steam distillation of the solvent and the unreacted monomer, followed by filtration. The polymer product is then dried to remove residual amounts of solvent and water (if present). The polymer product can be dried using any conventional method such as vacuum drying, drum drying, extruder drying, steam water desolventizing and the like.

The polymer is continuously withdrawn from the polymerization reactor at the same rate as the monomer and catalyst stream are fed to the reactor. Steady state conditions are reached after three (3) residence cycles. At this time, the polymer can be removed from the reactor at the same rate as the monomer and catalyst streams are being fed to the reactor.

The final product is a high-cis, low gel polydiene. The polydiene preferably has a cis content greater than about 85%, more preferably greater than about 90%. The gel content of the final product is preferably less than about 20%, more preferably less than about 10%. The static gel content of the final product is preferably less than about 10%, more preferably less than about 5%. The use of EHA/water/NaOH as a termination mixture leads to extremely low static gel contents of generally less than 2%. The weight-average molecular weight ($M_w$) of the final product is preferably between about 60,000 and 600,000, more preferably between about 100,000 and 450,000, and most preferably between about 150,000 and 400,000.

The high cis low gel polydienes formed in conjunction with the present invention may find uses in a variety of applications. For example, the polymer obtained may be employed in rubber uses that require mechanical characteristics and abrasion resistance, for example, tire, hose, belt, golf ball, plastics modification and other various industrial applications.

It is frequently desirable to include other additives known in the art to the compositions of the present invention. Suitable additives include stabilizers, antioxidants, conventional fillers, processing aids, accelerators, extenders, curing agents, reinforcing agents, reinforcing resins, pigments, fragrances, and the like. Other additives known in the art are also contemplated for use in the present invention. Specific examples of useful antioxidants and stabilizers include 2-(2'-hydroxy-5'-methylphenyl) benzotriazole, nickel di-butyl-di-thiocarbamate, tris(nonylphenyl) phosphite, 2,6-di-t-butyl4-methylphenol, and the like. Exemplary conventional fillers and pigments include silica, carbon black, titanium dioxide, iron oxide, and the like. Suitable reinforcing materials are inorganic or organic products of high molecular weight. Examples include glass fibers, asbestos, boron fibers, carbon and graphite fibers, whiskers, quartz and silica fibers, ceramic fibers, metal fibers, natural organic fibers, and synthetic organic fibers. These compounding ingredients are incorporated in suitable amounts depending upon the contemplated use of the product, preferably in the range of about 1–350 parts of additives or compounding ingredients per 100 parts of the high cis low gel polydiene.

EXAMPLES

The invention is described more fully based on the following examples as set forth herebelow. However, the invention should be in no way construed as to be limited by these examples.

Samples of high-cis polybutadiene were prepared using reactant amounts as set forth in table 1. Various termination mixtures were used to stop the reaction. Sample 1 corresponds to a TMEDA termination. Sample 2 corresponds to a water/TMEDA termination. Samples 3–7 correspond to EHA/NAOH/water termination. As seen in table 1, the use of an EHA/NaOH/water termination mixture resulted in a polymer having a static gel content of less 1.3% in all instances, and substantially lower than a polymer terminated with a TMEDA or TMEDA/water mixture without NaOH. Microgel is a measure of the area of a GPC scan after filtration of the dissolved sample compared to the area of a similar standard polymer of known gel content.

Static gel is the amount of polymer which does not dissolve in toluene after sitting for 48 hours, without agitation.

TABLE 1

Nickel Hi-Cis Termination Examples

| Sample No. | 1 | 2 | 3 | 4 | 5 | 6 | 7 |
|---|---|---|---|---|---|---|---|
| Hexane Rate (pounds/hour) | 37,619 | 37,619 | 131 | 100 | 100 | 106.5 | 95.5 |
| Butadiene (BD) Rate (pounds/hour) | 10,000 | 10,000 | 25 | 25 | 25 | 25 | 25 |
| Ni mmoles/100 g BD | 0.06 | 0.06 | 0.08 | 0.08 | 0.08 | 0.03 | 0.06 |
| Triisobutyl Aluminum mmoles/100 g BD | 1.3 | 1.3 | 3.48 | 2.38 | 2.49 | 2.011 | 1 |
| BF3 mmoles/100 g BD | 1.43 | 1.43 | 3.29 | 2.52 | 3.27 | 1.819 | 1.8 |
| Peak Reaction Temperature (° F.) | 245 | 245 | 205 | 235 | 222 | 215 | 235 |
| TMEDA mmoles/100 g BD | 1.7 | 1.7 | 0 | 0 | 0 | 0 | 0 |
| EHA mmoles/100 g BD | 0 | 0 | 9.85 | 8.91 | 9.84 | 10.75 | 8.13 |
| Water mmoles/100 g BD | 0 | 800 | 72.14 | 60.09 | 71.65 | 593 | 593 |
| Sodium Hydroxide mmoles/100 g BD | 0 | 0 | 10.96 | 9.18 | 10.85 | 11.29 | 8.54 |
| Mooney Viscosity (ML4 + 1 @ 100° C.) | 56.3 | 49.3 | 54.5 | 45 | 35.7 | 46 | 30.8 |
| Mooney T-80 (seconds) | 16.7 | 13.1 | 7.3 | 4.7 | 5.9 | 5.2 | 10.5 |
| Mn | 58050 | 62645 | 84507 | 73113 | 71460 | 78413 | 48781 |
| Mw | 204463 | 226598 | 367471 | 326761 | 308720 | 329017 | 215266 |
| Microgel | 13.00% | 9.00% | | | | | 6.00% |
| Static Gel | 17.60% | 3.70% | 0.60% | 0.90% | 1.30% | 0.10% | 0.00% |

The invention has been described with reference to the exemplary embodiments. Modifications and alterations will occur to others upon reading and understanding the specification. The invention is intended to include such modifications and alterations insofar as they come within the scope of the disclosure and claims.

We claim:

1. A process for forming a high-cis polydiene, the process comprising the steps of:
   a. catalyzing a diene polymerization, and
   b. terminating the polymerization with a termination mixture comprising an inorganic base and at least one of an amine and a carboxylic acid.

2. The process of claim 1 wherein said catalyzing is carried out by a catalyst system comprising at least an organonickel compound, an organoaluminum compound, and a fluorine-containing compound.

3. The process of claim 2 wherein said organonickel compound is selected from the group consisting of nickel benzoate, nickel acetate, nickel naphthenate, nickel octanoate, bis(alpha-furyl dioxime)nickel, nickel palmitate, nickel stearate, nickel acetylacetonate, nickel salicaldehyde, bis(salicylaldehyde) ethylene diimine nickel, bis(cyclopentadienyl) nickel, cyclopentadienylnickel nitrosyl, nickel tetracarbonyl, nickel boroacylate, and mixtures thereof.

4. The process of claim 2 wherein said organoaluminum compound is selected from the group consisting of trimethylaluminum, triethylaluminum, triisobutylaluminum, tri-n-butylaluminum, trihexylaluminum, and mixtures thereof.

5. The process of claim 2 wherein said fluorine-containing compound is boron trifluoride or a boron trifluoride complex prepared by complexing boron trifluoride with a member selected from the group consisting of monohydric alcohols, phenols, water, mineral acids containing oxygen, aldehydes, esters, ethers, ketones and nitriles.

6. The process of claim 2 wherein said fluorine-containing compound is hydrogen fluoride or a hydrogen fluoride complex prepared by complexing hydrogen fluoride with a member selected from the group consisting of monohydric alcohols, phenols, water, mineral acids containing oxygen, aldehydes, esters, ethers, ketones and nitriles.

7. The process of claim 2 wherein said catalyst system further comprises one or more alcohols.

8. The process of claim 1 wherein said diene polymerization comprises the polymerization of diene monomer units.

9. The process of claim 8 wherein said diene monomer units are conjugated diene monomer units.

10. The process of claim 9 wherein said conjugated diene monomer units are selected from the group consisting of 1,3 butadiene, 1,3-pentadiene, 2,4-hexadiene, isoprene, and mixtures thereof.

11. The process of claim 1 wherein said termination mixture further comprises water.

12. The process of claim 1 wherein said inorganic base is selected from the group consisting of NaOH and $NaCO_3$.

13. The process of claim 1 wherein said amine compound is selected from the group consisting of TMEDA, triethylamine, diethylamine, and mixture thereof.

14. The process of claim 1 wherein said inorganic base is added in an amount such that said termination reaction is conducted under conditions with a pH of 7 or greater.

15. The process of claim 11 wherein the ratio of amine compound to water is about 1:500.

16. The process of claim 15 wherein said cis content is greater than about 92%.

17. The process of claim 15 wherein said static gel content is less than about 5%.

18. The process of claim 17 wherein the static gel content is about 2% or less.

19. The process of claim 1 wherein said polydiene includes polybutadiene monomer units.

20. The process of claim 1 wherein said carboxylic acid is 2-ethyl hexanoic acid.

21. The process of claim 1 wherein said termination mixture comprises a carboxylic acid and a metal salt of a carboxylic acid.

22. The process of claim 21 wherein said termination mixture comprises 2-ethyl hexanoic acid and a calcium salt of 2-ethyl hexanoic acid.

23. The process of claim 2 wherein said inorganic base is present in an amount at least equal to the molar equivalent of the $F^-$ ions present in the fluorine containing compound.

24. A process for producing high-cis polydienes comprising a continuous polymerization of nickel catalyzed polydiene terminated by a termination mixture comprising sodium hydroxide and at least one of an amine and a carboxylic acid.

25. The process of claim 24 wherein said termination mixture further comprises water and said amine is selected from the group consisting of tertiary amines, TMEDA, triethyl amine, tripropyl amine, and mixtures thereof.

26. The process of claim wherein said termination mixture comprises sodium hydroxide, 2-ethyl hexanoic acid and a calcium salt of 2-ethyl hexanoic acid.

* * * * *